United States Patent
Nissam et al.

(10) Patent No.: US 11,093,562 B2
(45) Date of Patent: Aug. 17, 2021

(54) EVENT STREAM PROCESSING (71) Applicant: ENT. SERVICES DEVELOPMENT CORPORATION LP, Houston, TX (US)

(72) Inventors: Hamith Nissam, Chennai (IN); Vishal Rao, Bangalore (IN); Niranjan R. Kamath, Bangalore (IN); Vikram Kulkarni, Bangalore (IN); Sambhavi Piskala Dhanabalan, Chennai (IN); Tulika Chatterjee, Bangalore (IN)

(73) Assignee: ENT. SERVICES DEVELOPMENT CORPORATION LP, Houston, TX (US)

( * ) Notice: Subject to any disclaimer, the term of this patent is extended or adjusted under 35 U.S.C. 154(b) by 254 days.

(21) Appl. No.: 15/306,293

(22) PCT Filed: Aug. 4, 2014

(86) PCT No.: PCT/IN2014/000512
§ 371 (c)(1),
(2) Date: Oct. 24, 2016

(87) PCT Pub. No.: WO2016/020927
PCT Pub. Date: Feb. 11, 2016

(65) Prior Publication Data
US 2017/0147697 A1    May 25, 2017

(51) Int. Cl.
*G06F 16/9535* (2019.01)
*G06F 16/2458* (2019.01)
*G06F 16/2455* (2019.01)
*G06F 21/00* (2013.01)
*G06Q 10/06* (2012.01)

(52) U.S. Cl.
CPC ...... *G06F 16/9535* (2019.01); *G06F 16/2477* (2019.01); *G06F 16/24565* (2019.01); *G06F 16/24568* (2019.01); *G06F 21/00* (2013.01); *G06Q 10/06* (2013.01)

(58) Field of Classification Search
CPC .......... G06F 16/24568; G06F 16/9535; G06F 16/2477; G06F 21/00; G06F 16/24565; G06Q 10/06
See application file for complete search history.

(56) References Cited

U.S. PATENT DOCUMENTS

| 7,408,458 | B1* | 8/2008 | Sheleheda | G08B 25/001 340/506 |
| 7,793,835 | B1* | 9/2010 | Coggeshall | G06Q 20/4016 235/380 |
| 8,166,351 | B2 | 4/2012 | Slutsman et al. | |

(Continued)

OTHER PUBLICATIONS

Cugola et al., "TESLA: A Formally Defined Event Specification Language", Jul. 2010, ACM.*

(Continued)

*Primary Examiner* — Irete F Ehichioya
*Assistant Examiner* — Huen Wong
(74) *Attorney, Agent, or Firm* — Polsinelli PC (57) ABSTRACT

An example system receives a plurality of event streams. A separate stream rule is applied to each individual event stream to produce a filtered output event stream. The system also applies a correlation rule to the filtered output event streams to produce correlated event results.

11 Claims, 6 Drawing Sheets

(56) References Cited

U.S. PATENT DOCUMENTS

| | | | | |
|---|---|---|---|---|
| 8,374,986 | B2* | 2/2013 | Indeck | G06N 5/025 706/47 |
| 2005/0010545 | A1* | 1/2005 | Joseph | G06F 9/542 |
| 2006/0130070 | A1 | 6/2006 | Graf | |
| 2007/0283194 | A1* | 12/2007 | Villella | G06F 11/3476 714/57 |
| 2008/0301135 | A1* | 12/2008 | Alves | G06F 17/30442 |
| 2008/0301207 | A1* | 12/2008 | Demarest | G06F 17/30563 |
| 2009/0089352 | A1* | 4/2009 | Davis | G06Q 10/00 709/201 |
| 2009/0119307 | A1* | 5/2009 | Braun | G06F 17/30964 |
| 2009/0265288 | A1* | 10/2009 | Chakravarty | G06N 5/022 706/11 |
| 2009/0287628 | A1* | 11/2009 | Indeck | G06F 16/24568 706/47 |
| 2010/0017380 | A1* | 1/2010 | Naibo | G06Q 10/06 707/E17.136 |
| 2010/0106611 | A1* | 4/2010 | Paulsen | G06Q 20/102 705/26.1 |
| 2011/0251951 | A1* | 10/2011 | Kolkowitz | G06Q 20/40 705/39 |
| 2011/0288692 | A1* | 11/2011 | Scott | G06F 21/55 700/297 |
| 2011/0296123 | A1* | 12/2011 | Adler | G06F 12/0246 711/156 |
| 2012/0054420 | A1* | 3/2012 | Kang | G06F 17/30516 711/103 |
| 2012/0060173 | A1* | 3/2012 | Malnati | G06F 11/3055 719/318 |
| 2012/0166421 | A1* | 6/2012 | Cammert | G06F 17/30474 707/718 |
| 2013/0325890 | A1 | 12/2013 | Vaught | |
| 2014/0032535 | A1 | 1/2014 | Singla | |
| 2014/0095444 | A1 | 4/2014 | Deshmukh et al. | |
| 2014/0095541 | A1* | 4/2014 | Herwadkar | G06F 17/30442 |
| 2014/0359008 | A1* | 12/2014 | Finney | H04W 4/21 709/204 |
| 2015/0100436 | A1* | 4/2015 | Spofford | G06Q 30/0275 705/14.71 |
| 2015/0112917 | A1* | 4/2015 | Lorentzen | G06Q 30/0201 706/47 |
| 2015/0199406 | A1* | 7/2015 | Liang | H04L 41/0622 707/754 |
| 2015/0213358 | A1* | 7/2015 | Shelton | H04L 41/0604 706/47 |
| 2015/0381712 | A1* | 12/2015 | de Castro Alves | G06F 16/24568 709/201 |
| 2016/0182251 | A1* | 6/2016 | Weygandt | H04L 12/40163 710/316 |

OTHER PUBLICATIONS

Bhattacharya, et al., "Analytics on Big Fast Data using Real Time Stream Data Processing Architecture, 2013 EMC Proven Professional Knowledge Sharing," 34 p. <http://www.happiestminds.com/sites/all/themes/happiestminds/pdf/ANALYTICS_ON_BIG_FAST_DATA_USING_A_REALTIME_STREAM_DATA_PROCESSING_ARCHITECTURE.pdf>.

Dindar et al., "Efficiently Correlating Complex Events over Live and Archived Data Streams," DEBS '11, Jul. 11-15, 2011, 12 p. <http://people.csail.mit.edu/tatbul/publications/dejavu_debs11.pdf>.

PCT; "Notification of Transmitial of the International Search Report and the Writien Opinion of the International Searching Authority, or the Declaration"; cited in PCT/IN2014/000512; dated May 11, 2015; 11 pages.

wordpress.com, "In Stream Big Data Processing," Aug. 20, 2013, 34 p. <http://highlyscalable.wordpress.com/2013/08/20/in-stream-big-data-processing/>.

Zhou et al., "SCEPter: Semantic Complex Event Processing over End-to-End Data Flows," Apr. 2012, 20 p.

\* cited by examiner

EVENT STREAM PROCESSING

CLAIM FOR PRIORITY

The present application is a national stage filing under 35 U.S.C. § 371 of PCT application number PCT/IN2014/000512, having an international filing date of Aug. 4, 2014, the disclosure of which is hereby incorporated by reference in its entirety.

BACKGROUND

Many businesses today analyze large amounts of data to make business decisions. Often the amount of data to be analyzed is voluminous, to the point at which real-time analysis of such large amounts of data is problematic. Analysis of such data may burden processing (e.g., latency) and storage resources.

BRIEF DESCRIPTION OF THE DRAWINGS

For a detailed description of various examples, reference will now be made to the accompanying drawings in which.

DETAILED DESCRIPTION

The examples disclosed herein reduce the detrimental impacts that may occur to processing and/or storage resources in the face of analyzing data such as large amounts of data in a short period of time. The data may be received by the disclosed systems in the form of multiple input event streams and the system may process the event streams by one or more complex event rules. An event is any data item that typically occurs over time. A complex event rule is a rule that causes a system to track and analyze streams of information about things that happen and derive conclusions from them. Complex event processing (CEP) is event processing that combines data from multiple sources to infer events or patterns that suggest more complicated circumstances. A goal of complex event processing is to identify meaningful events (such as opportunities or threats) and respond to them as quickly as possible.

Some disclosed examples provide for an initial filtering of each individual input event stream followed by correlating the filtered results. Because the input event streams are initially separately filtered, less data is then subjected to the correlation operation, which thereby alleviates the burden on the processing resources of the system. A historical rule and/or a time window-based rule may be applied to the correlated results. A historical may be, for example, a rule that specifies an operation to be performed that is based on previously stored information. Application of a historical rule generally entails an access to a non-volatile device such as a hard disk drive, which incurs significant latency overhead relative to an access of volatile storage such as random access memory. A time window-based rule may be applied to the correlated results or the results from the application of the historical rule. A time window-based rule may entail the determination of certain events that occur over a defined period of time (a time window). As such, the correlated results or results from the application of the historical rule are saved to memory for subsequent analysis per the time window-based rule. Storage of such results in memory may burden the memory resources in the system, but applying the time window-based rule after the initial filtering of the individual event streams and after correlation of such data reduces the amount of data to be saved per the time window-based rules.

An example of the usefulness of the disclosed systems is for credit card fraud detection. For example, a fraud detection complex event rule might be to check for credit card transactions for a given card in excess of $500 and for which the credit card owner's cell phone GPS indicates that the user is within a threshold distance of the point of sale (credit card swipe location). Most card users also carry a cell phone and the location of the cell phone and the location of the credit card swipe should be the same–a difference in locations may be indicative of fraudulent activity. The complex event may also include detecting whether the same credit card has been used in at least two locations more than a threshold distance apart in less than a certain period of time. That a credit card has been used, for example, in two locations more than 100 miles apart in less than 30 minutes may also be indicative of a fraudulent credit card use. The complex event rule may also cause, in the case of a fraud event being detected, a different level of a fraud response service to be performed for different levels of credit card customers. For example, a credit card company may offer platinum, gold, silver, and bronze service levels. The reaction to a fraud event may differ from platinum users than for bronze users. For a platinum user, a fraud response service may put a temporary hold on the card, send a text message to the card owner, make a phone call to one or more phone numbers associated with the card owner, and automatically issue the card owner a new card, but for a bronze user, the service might only put a temporary hold on the card. This particular credit card fraud detection complex event rule is referred to below throughout the description of the implementations described herein.

Figure 1:
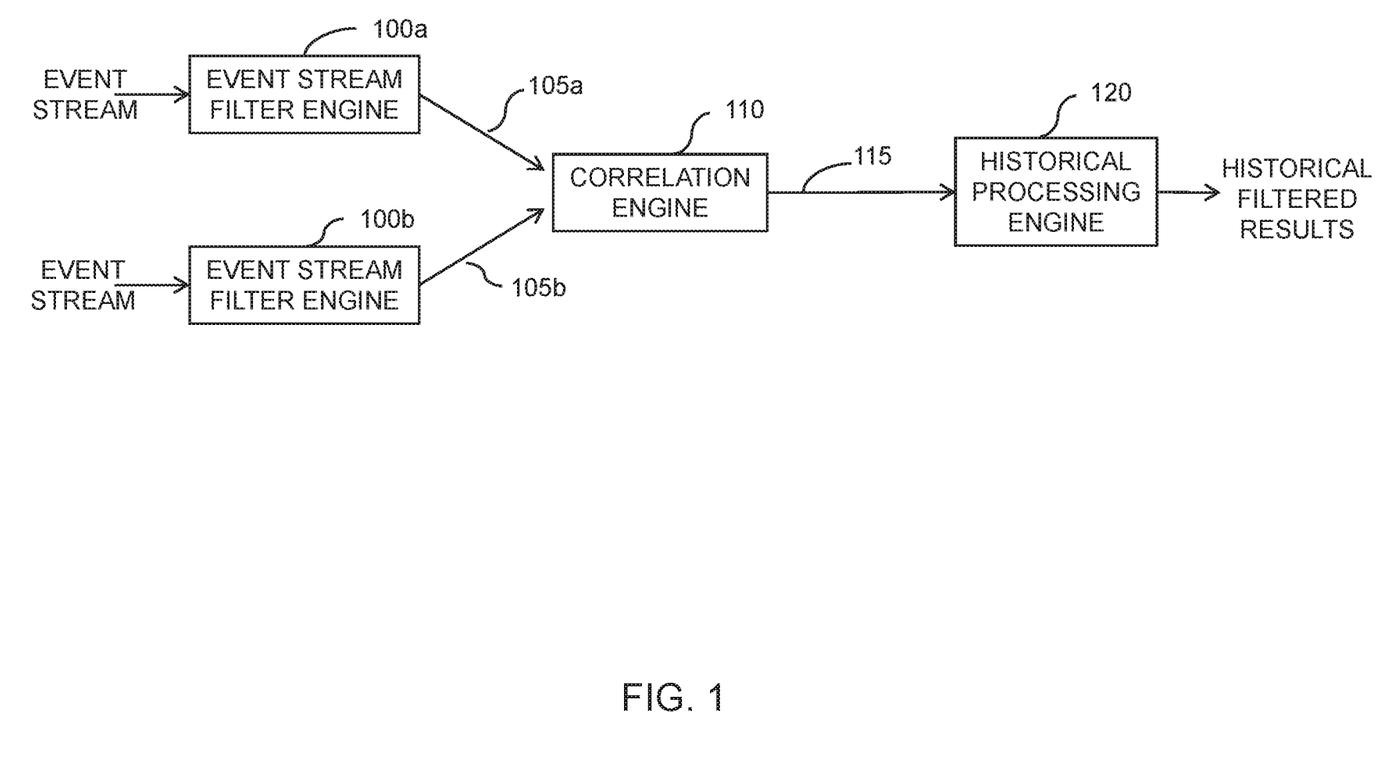
FIG. 1 shows a system in accordance with various examples.

FIG. 1 shows an example of a system including one or more event stream filter engines (event stream filter engines 100a and 100b shown in FIG. 1), a correlation engine 110, and a historical processing engine 120. Each event stream filter engine 100a, 100b receives a separate event stream as shown. Each event stream includes a plurality of records related to a particular activity. Some or all of the records of a given event stream may have a time stamp (time and/or date) to record when that particular event occurred. In the example above, the event stream provided to event stream filter engine 100a may include credit card transaction records including such information as credit card account number, amount of transaction, location of transaction (point of sale), date and time the transaction occurred, credit card account holder's name, etc. The event stream provided to event stream filter engine 100b may include cell phone records including such information as cell phone location data (e.g., obtained from the phone's Global Positioning System (GPS) receiver), cell phone account holder's name, date and time the GPS location was obtained, etc. In some implementations, a credit card owner may agree to have his or her cell phone location monitored as part of the credit card fraud detection for that person's credit card. As such, the credit card owner may register his or her cell phone (e.g., cell phone number, cell phone carrier identity and account number, authorize to have his phone's location monitored, etc.) with the credit card fraud detection service.

Each event stream filter engine 100a, 100b implements a filter rule that is specified for that particular event stream to generate a filtered output event stream. Event stream filter engine 100a thus generates a filtered output event stream 105a and event stream filter engine 100b generates a filtered output event stream 105b. For example, if the event stream for event stream filter engine 100a includes credit card transactions, the filter rule for that engine might be to exclude credit card transactions that are less than $500. If the event stream for event stream filter engine 100b includes cell phone records, the filter rule for that filter engine might be to exclude those cell phone records that do not have a complete cell phone location. For example, the fraud detection service may prompt the user's cell phone to report its location every 10 minutes so that the service knows the location of the cell phone at all times (at least within a resolution of 10 minutes). If the cell phone's GPS is disabled, non-functional or the phone is inside a building and not within line of sight of a GPS satellite, the data record reported by the phone might not have any or enough information to enable the service to precisely determine the location of the user's phone. Each individual filter rule thus causes a subset of the event stream received by that event stream filter engine to be output by the event stream filter engine as the filtered output event stream. Therefore, there are fewer records in filtered output event streams 105a, 105b than in their counterpart input event streams.

Each filter rule for a given event stream filter engine only applies to the event stream for that particular event stream filter engine. That is, the various input event streams are separately filtered without regard to the records of the other stream(s).

The correlation engine 110 then receives the filtered output event streams 105a, 105b from the event stream filter engines 100a, 100b. The correlation engine 110 applies a correlation rule to the filtered output event streams to produce correlated event results 115. The correlation rule causes the correlation engine 110 to compare the individual filtered output event streams 105a, 105b to each other. By way of the preceding example, a correlation rule might cause the correlation engine 110 to associate the location of a particular customer's credit card transaction in excess of $500 (from filtered output event stream 105a) with the same customer's cell phone location information (from filtered output event stream 105b). The correlation engine 110 associates records from the various filtered output event streams 105a, 105b (e.g., associating credit card transactions above $500 and their location with the card owner's cell phone location) to form "tuples" in the correlated event results 115.

The correlated event results 115 are then provided to the historical processing engine 120, which applies a historical rule to the correlated event results 115 to produce historical filtered results. The historical rule indicates a processing operation to be performed by the historical processing engine 120 on the correlated event results based on data previously mapped to at least one of the event streams and previously stored in non-volatile storage (not shown in FIG. 1 but shown in other figures). For example, the correlated event may indicate a possible fraud event and the complex event rule may require the performance of a certain response operation based on the credit card service level of the credit card owner as exemplified above. The historical processing engine 120, per the historical rule, retrieves the credit card service level from the non-volatile storage and performs the corresponding response operation. For example, the response operation might be different for a platinum credit card owner than a bronze credit card owner. Because the event stream filter engine 100a has already filtered out certain transactions and because the correlation engine 110 has already correlated the remaining transactions to cell phone location data, there are fewer potential credit card transaction records requiring access to the non-volatile storage than might otherwise have been the case. As such, less bandwidth is needed for accesses to the non-volatile storage.

Figure 2:
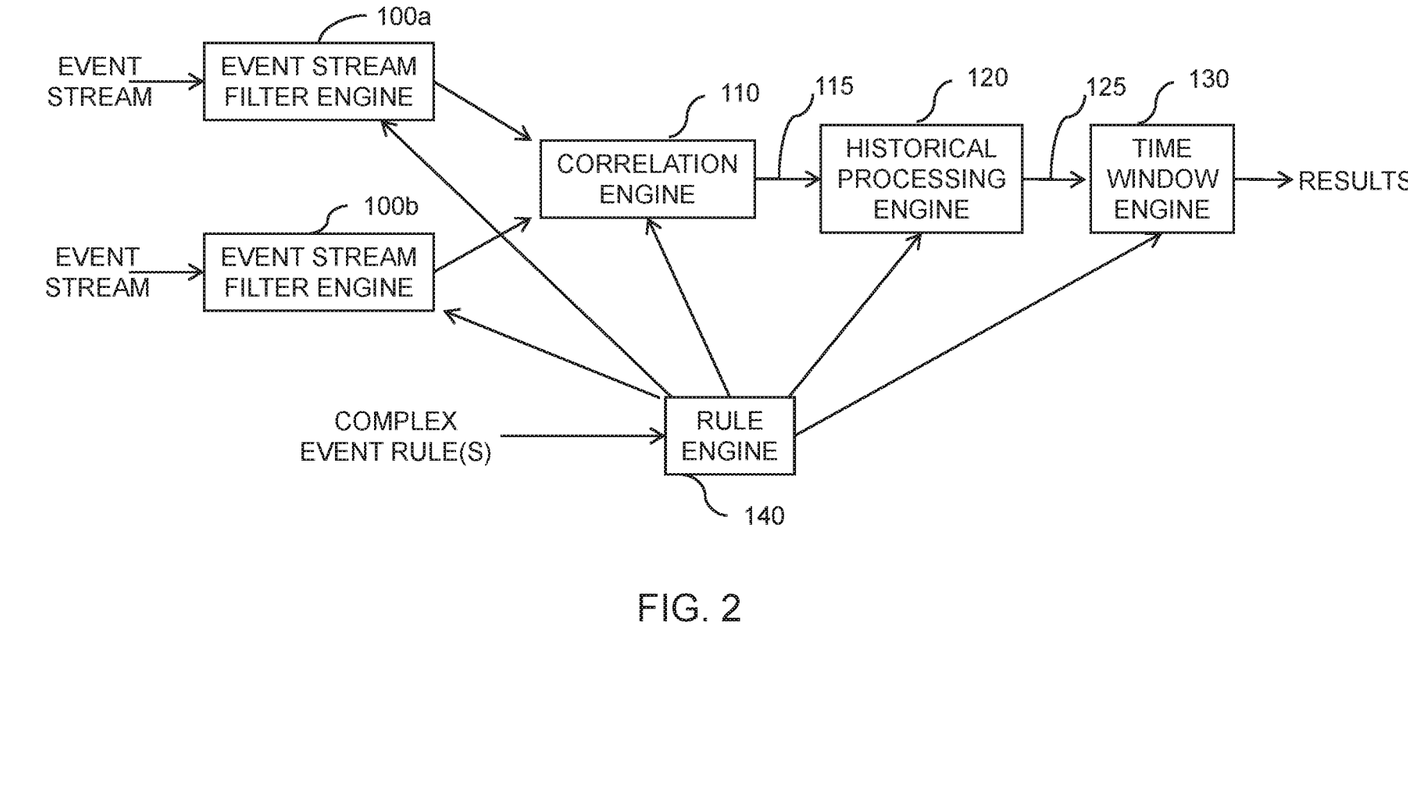
FIG. 2 shows a system in accordance with other examples.

FIG. 2 illustrates another implementation, similar in some respects to that of FIG. 1. Like the implementation of FIG. 1, the implementation of FIG. 2 also includes event stream filter engines 100a, 100b, a correlation engine 110, and a historical processing engine 120. A description of those components, therefore, will not be repeated with respect to FIG. 2. The implementation of FIG. 2 includes a time window engine 130 and a rule engine 140.

After the historical processing engine 120 processes the correlated event results 115 to produce the historical event results (identified in FIG. 2 with reference numeral 125), the time window engine 130 applies a time window-based rule to the historical filtered results 125. The time window-based rule specifies a plurality of historical filtered results 125 that must be true over a defined period of time. For example, a time window-based rule may specify that two or more credit card transactions occurring within a 30 minute window and more than 100 miles apart is indicative of fraudulent activity. To implement this rule, the time window engine 130 must store, or caused to be stored, credit card transactions over a rolling 30-minute window. However, because the event streams have been significantly filtered, and thus reduced, by the correlation and historical processing engines 110, 120, there is less data to be stored for the relevant time window than otherwise would be the case if the time window-based rule was applied before, for example, the correlation stage.

The implementation of FIG. 2 also includes a rule engine 140, which receives one or more complex event rules. For each such complex event rule, the rule engine 140 decomposes the complex event rule to generate the filter rules for the various event stream filter engines, the correlation rule, the historical rule, and the time window-based rule and provides those rules to the corresponding engines 100a, 100b, 110, 120, and 130. The rule engine 140 has knowledge of the type and format of the event streams and uses that knowledge in the decomposition process. For example, one of the event streams may include credit card transactions as noted above, with each transaction including a dollar amount of the transaction among other information. If the complex event rule received by the rule engine 140 specifies that only credit card transactions in excess of $500 are to be considered for possible credit card fraud, then the rule engine 140 decomposes the complex event rule to generate a filter rule that specifies that credit card transactions less than $500 are dropped from the event stream and not forwarded on to the correlation engine 110.

Figure 3:
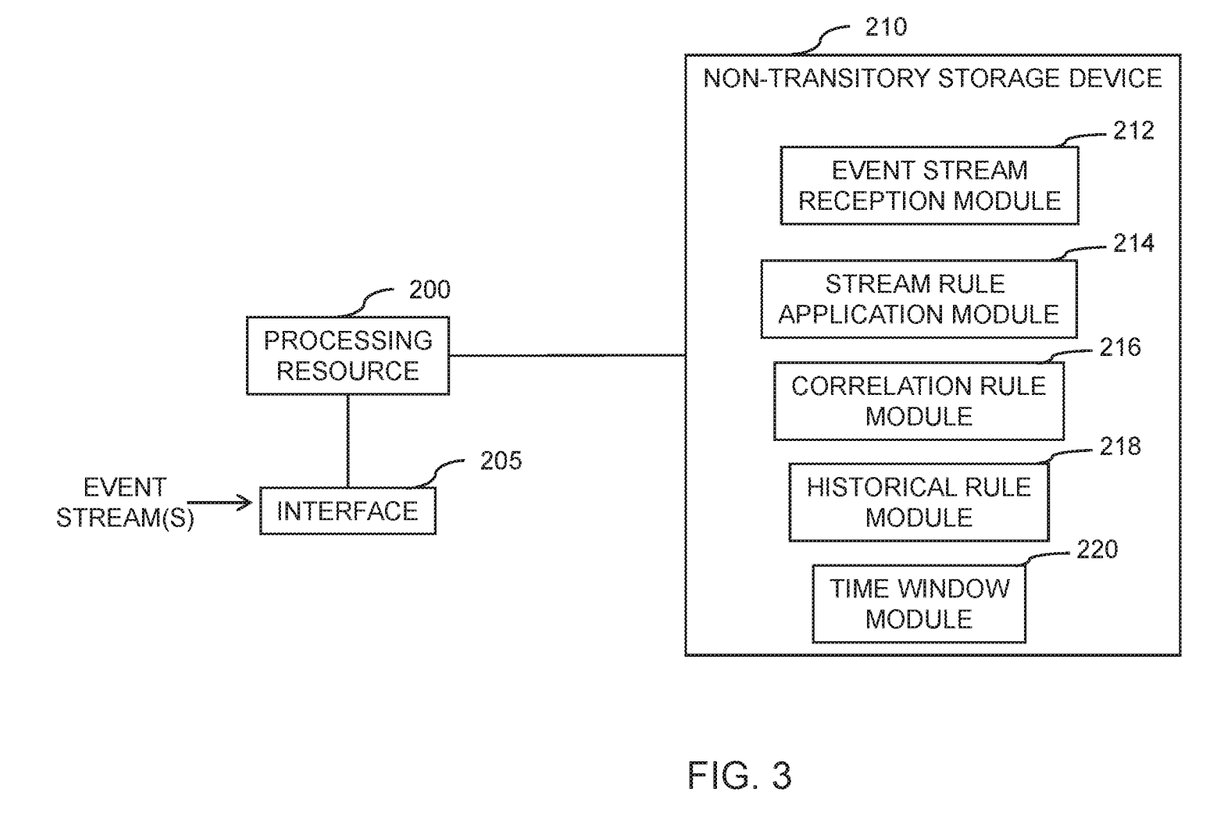
FIG. 3 shows yet another example of a system.

FIG. 3 shows an example of the implementation of FIG. 1. FIG. 3 shows a processing resource 200 coupled to an interface 205 and a non-transitory storage device 210. The processing resource 200 may include a single processor, multiple processors, a single computer, a network of computers, or any other type of hardware processing resource. The processing resource 200 receives the event streams via interface 205. Interface 205 may provide network access and/or access to a peripheral device which provides the event streams.

The non-transitory storage device 210 may include volatile storage such as random access memory, non-volatile storage such as a magnetic storage device, optical storage device, solid state storage device, etc. or combinations thereof. The non-transitory storage device 210 includes an event stream reception module 212, a stream rule application module 214, a correlation rule module 216, a historical rule module 218, and a time window module 220. Each of these modules includes machine instructions, which are executable by the processing resource 200. Each of the engines of FIG. 1 is implemented as the processing resource 200 of FIG. 3 executing a corresponding module. For example, each event stream filter engine 100a, 100b is implemented as the processing resource 200 executing an instance of the stream rule application module 214, or one executed instance of the stream rule application module 214 may implement all event stream filter engines. The stream rule application module 214 causes the processing resource 200 to perform the functionality described herein attributed to the event stream filter engines (e.g., receive event stream and apply a filter rule). Similarly, the correlation engine 110 is implemented as the processing resource 200 executing the correlation rule module 216 which correlates the various filtered output event streams 105a, 105b. Further, the historical processing engine 120 is implemented as the processing resource 200 executing the historical rule module 218, which applies a historical rule to the correlated event results. Any information previously stored in non-volatile storage to be used in accordance with a historical rule may be stored in non-transitory storage device 210. The time window engine 130 is implemented as the processing resource 200 executing the time window module 220 which applies a time window-based rule as explained above. Data from the event streams to be stored in accordance with a time window-based rule may be stored in the non-volatile storage device 210.

Figure 4:
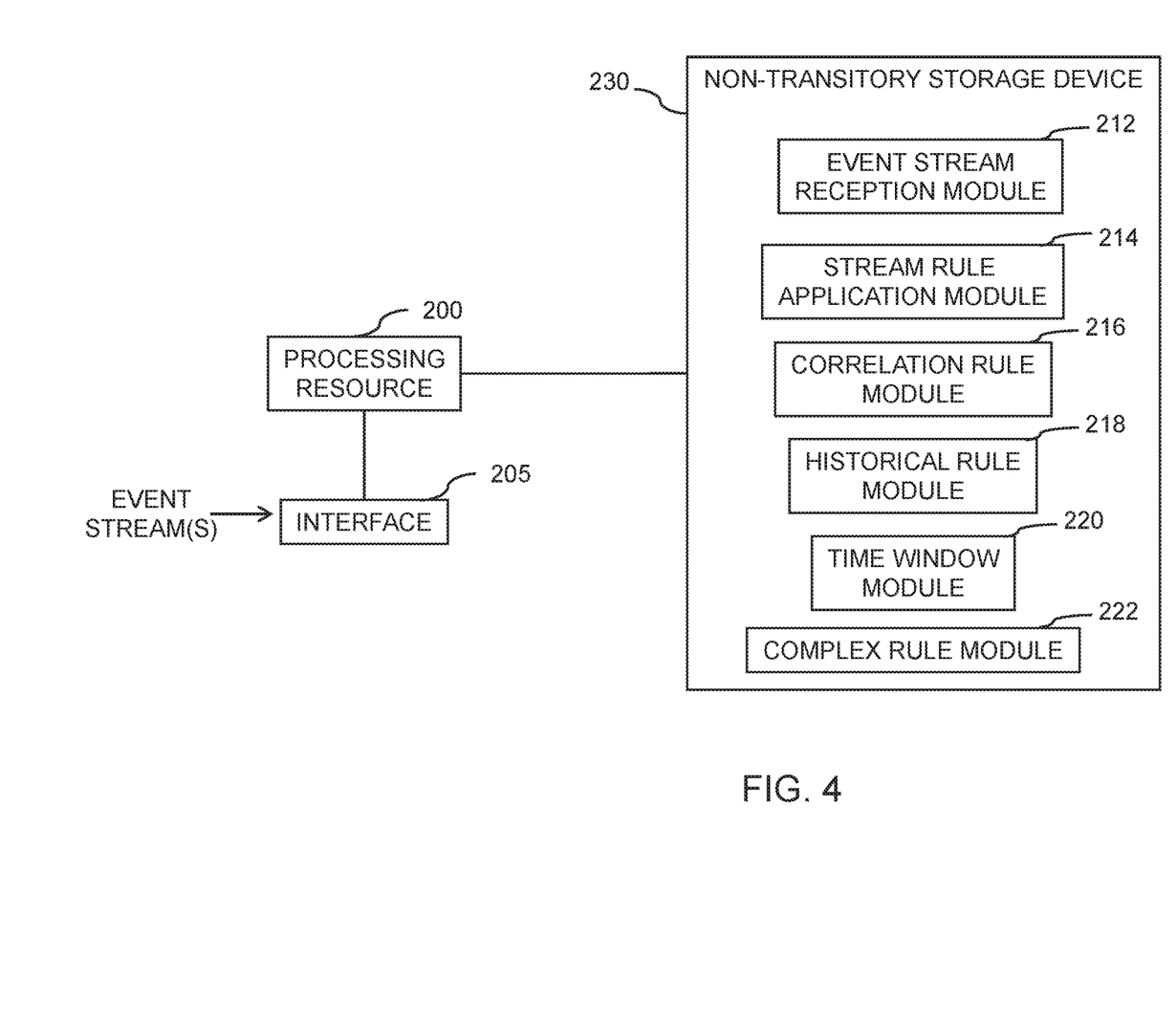
FIG. 4 shows another example of a system.

FIG. 4 shows the processing resource 200 coupled to a non-transitory storage device 230 that comprises volatile and/or non-volatile storage device 210 as for the non-transitory storage device of FIG. 3. Like the storage device 210 of FIG. 3, the storage device 230 of FIG. 4 includes an event stream reception module 212, a stream rule application module 214, a correlation rule module 216, a historical rule module 218, and a time window module 220, which perform the same or similar functions, once executed by processing resource 200, as their counterparts in FIG. 3.

The storage device 230 of FIG. 4 also includes a complex rule module 222, which is executable by the processing resource 200 to implement the following functionality. The complex rule module 222 causes the processing resource 200 to receive one or more complex event rules. For each such complex event rule, the complex rule module 222 decomposes the complex event rule to generate the filter rules for the various event stream filter engines, the correlation rule, the historical rule, and the time window-based rule described above and provides those rules to the corresponding engines 100a, 100b, 110, 120, and 130. The complex rule module 222 may be programmed with, or otherwise have access to, the type and format of the event streams and uses that information in the decomposition process as explained previously.

Figure 5:
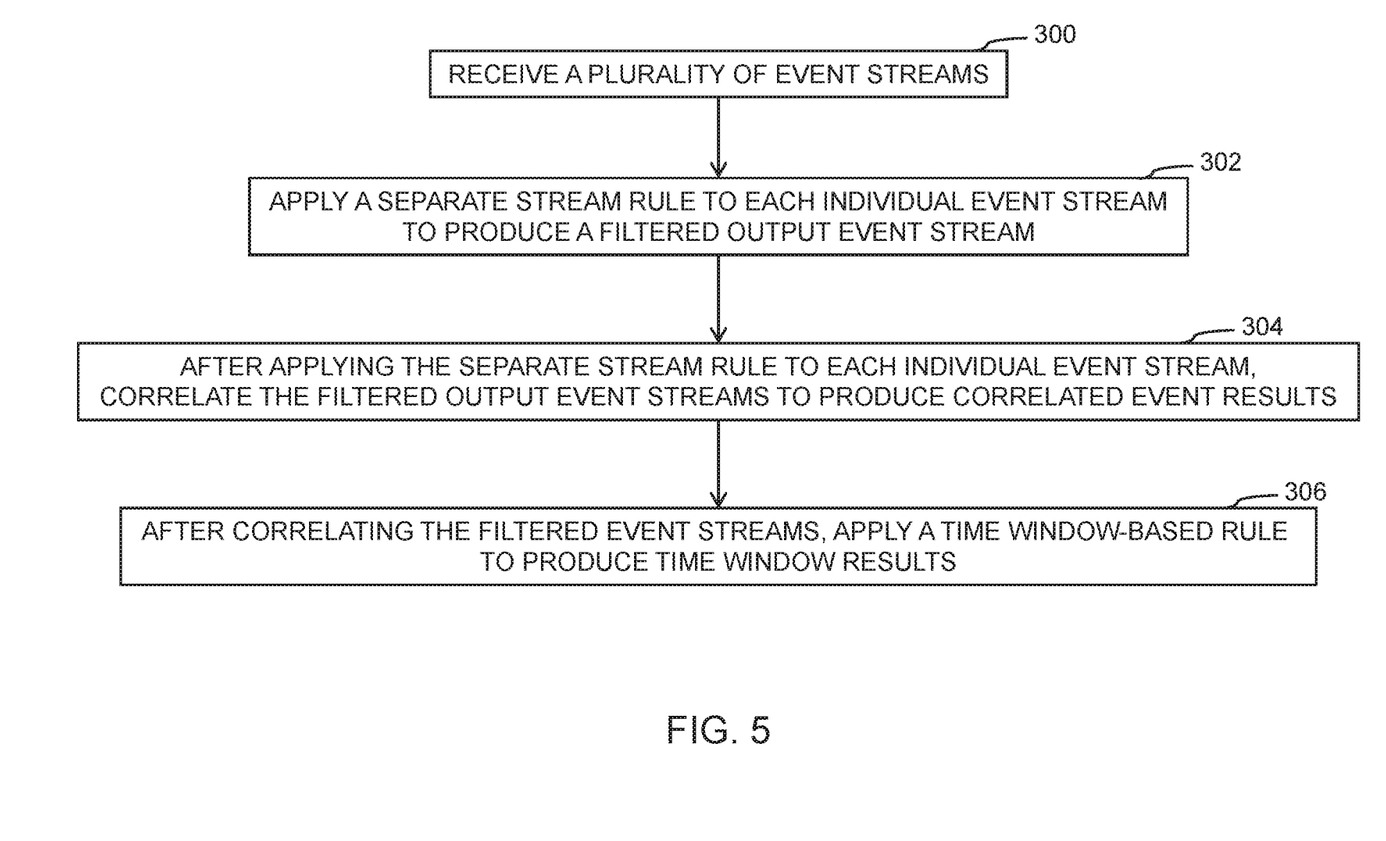
FIG. 5 shows a method in accordance with various examples.

FIG. 5 shows a method in accordance with an example. The various operations shown in FIG. 5 are performed the hardware described herein. At 300, the method includes receiving a plurality of event streams. The method at 302 applies a separate stream rule to each individual event stream to produce a filtered output event stream from each such event stream. At 304, after applying a separate stream rule to each individual event stream, the method includes correlating the filtered output event streams to produce correlated event results. After correlating the filtered event streams, the method then includes at 306 applying a time window-based rule to produce time window results.

Figure 6:
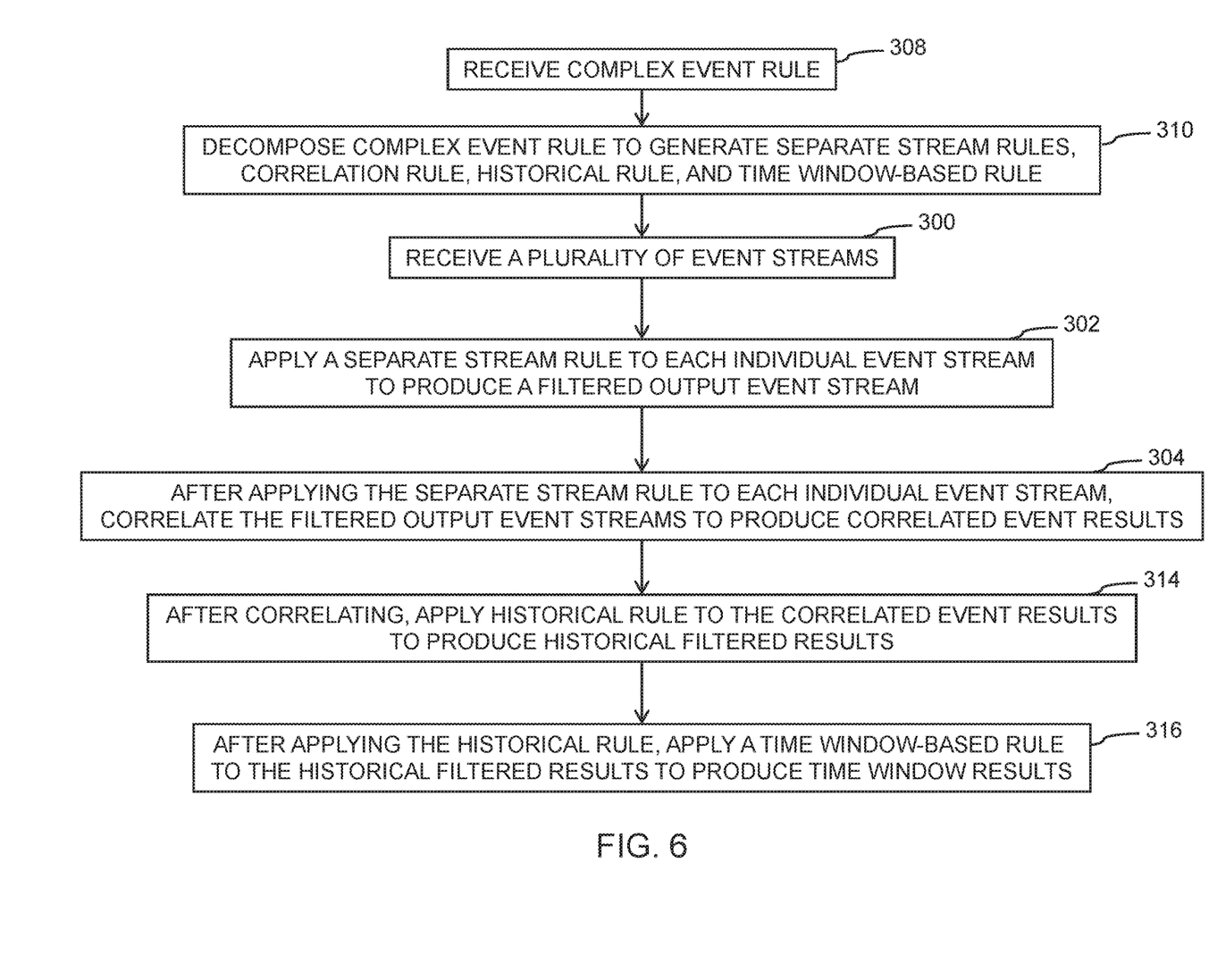
FIG. 6 shows another method in accordance with various examples.

FIG. 6 shows another method in accordance with another example. The various operations shown in FIG. 6 are performed the hardware described herein. At 308, the method includes receiving a complex event rule. At 310, method includes decomposing the complex event rule to generate separate stream rules, a correlation rule, a historical rule, and a time window-based rule.

At 300, the method includes receiving a plurality of event streams. The method then includes at 302 applying a separate stream rule to each individual event stream to produce a filtered output event stream from each such event stream. At 304, after applying a separate stream rule to each individual event stream, the method includes correlating the filtered output event streams to produce correlated event results. At 314, after correlating the filtered output event streams, the method includes applying the historical rule to the correlated event results to produce historical filtered results. At 316, after applying the historical rule, the method then includes applying a time window-based rule to the historical filtered results to produce time window results.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A system, comprising:
 a plurality of event stream filter engines to receive a plurality of event streams, each event stream filter engine to receive a separate event stream, apply a filter rule specified for that particular event stream filter, and generate a filtered output event stream, wherein at least one of the plurality of event streams is an event stream of financial transaction records associated with financial accounts, wherein each financial transaction record includes information identifying a respective financial account associated with the financial transaction record;
 a correlation engine to receive the filtered output event streams from the event stream filter engines and apply a correlation rule to the filtered output event streams to produce correlated event results, wherein each of the correlated event results is a tuple formed by associating different types records from at least two of the filtered output event streams;
 a historical processing engine to receive the correlated event results, and apply a historical rule to the correlated event results to produce historical filtered results, wherein the historical rule indicates a different fraud response operation to be performed by the historical processing engine on the correlated event results based on a service level attribute associated with the respective financial account, wherein the service level attribute is selected from a plurality of service level attributes, a class or category of the respective financial account is specified by the service level attribute, and the different fraud response operation to be performed on the correlated event results is determined based on the class or the category; and a time window engine to apply a time window-based rule to the historical filtered results to produce a fraud response, wherein applying the time window-based rule further comprises storing historical filtered results occurred within a defined period of time, wherein the time window-based rule defines that the fraud response is based on predefined classification of the stored historical filtered results.

2. The system of claim 1 further comprising a rule engine to: receive a complex event rule; and
decompose the complex event rule to generate:
the filter rules for the event stream filter engines;
the correlation rule;
the historical rule; and
the time window-based rule.

3. The system of claim 2 wherein the rule engine distributes the filter rules to the event stream filter engines, the correlation rule to the correlation engine, the historical rule to the historical processing engine, and the time window-based rule to the time window engine.

4. The system of claim 1 wherein:
each filter rule, when applied by the corresponding event stream filter engine, causes a subset of the event stream received by that event stream filter engine to be output by the event stream filter engine as the filtered output event stream; and
the correlation rule is to specify a relationship between separate filtered output event streams that the correlation engine is to detect.

5. The system of claim 1 wherein the correlation engine does not receive nor operate on the event streams received by the event stream filter engines.

6. A non-transitory storage device containing machine instructions that, when executed by a processing resource, cause the processing resource to:
receive a plurality of event streams, each event stream including a plurality of records;
apply a separate stream rule to each individual event stream to produce a plurality of filtered output event streams, wherein at least one of the plurality of filtered output event streams is an event stream of financial transaction records associated with financial accounts, wherein each financial transaction record includes information identifying a respective financial account associated with the financial transaction record;
after applying a separate stream rule to each individual event stream, apply a correlation rule to correlate the filtered output event streams to produce correlated event results, wherein each of the correlated event results is a tuple formed by associating different types records from at least two of the filtered output event streams;
after correlating the filtered output event streams, apply a historical rule to the correlated event results to produce historical filtered results, wherein the historical rule indicates a different fraud response operation to be performed on the correlated event results based on a service level attribute associated with the respective financial account, wherein the service level attribute is selected from a plurality of service level attributes, a class or category of the respective financial account is specified by the service level attribute, and the different fraud response operation to be performed on the correlated event results is determined based on the class or category; and after applying the historical rule, apply a time window-based rule to the historical filtered results to produce a fraud response, wherein applying the time window-based rule further comprises storing historical filtered results occurred within a defined period of time, wherein the time window-based rule defines that the fraud response is based on predefined classification of the stored historical filtered results.

7. The non-transitory storage device of claim 6 wherein the machine instructions, when executed, further cause the processing resource to:
receive a complex event rule from a user; and
decompose the complex event rule to generate:
stream rules;
the correlation rule;
the historical rule; and
the time window-based rule.

8. A method, comprising:
receiving a plurality of event streams;
applying a separate stream rule to each individual event stream to produce a filtered output event stream from each such event stream, wherein the filtered output event stream is an event stream of financial transaction records associated with financial accounts, wherein each financial transaction record includes information identifying a respective financial account associated with the financial transaction record;
after applying a separate stream rule to each individual event stream, correlating the filtered output event streams to produce correlated event results, wherein each of the correlated event results is a tuple formed by associating different types records from at least two of the filtered output event streams;
after correlating the filtered output event streams, applying a historical rule to the correlated event results to produce historical filtered results, wherein the historical rule indicates a different fraud response operation to be performed on the correlated event results based on a service level attribute associated with the respective financial account, wherein the service level attribute is selected from a plurality of service level attributes, a class or category of the respective financial account is specified by the service level attribute, and the different fraud response operation to be performed on the correlated event results is determined based on the class or the category; and
after applying the historical rule, apply a time window-based rule to the historical filtered results to produce a fraud response, wherein applying the time window-based rule further comprises storing historical filtered results occurred within a defined period of time, wherein the time window-based rule defines that the fraud response is based on predefined classification of the stored historical filtered results.

9. The method of claim 8:
wherein each event stream includes a plurality of records;
wherein applying the separate stream rule to each such event stream comprises causing a subset of the records of each event stream to be the filtered output event stream for that event stream; and
wherein correlating the filtered output event streams comprises applying a correlation rule that specifies a relationship between separate filtered output event streams.

10. The method of claim 8, further comprising, after applying the historical rule, applying a time window-based rule to produce time window results.

11. The method of claim 10, further comprising:
receiving a complex event rule; and
decomposing the complex event rule to generate:
   stream rules;
   the correlation rule;
   the historical rule; and
   the time window-based rule.

\* \* \* \* \*